(12) United States Patent
Kida

(10) Patent No.: US 8,864,612 B2
(45) Date of Patent: Oct. 21, 2014

(54) CAM SPROCKET AND METHOD FOR MANUFACTURING THE SAME

(75) Inventor: Koji Kida, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 19 days.

(21) Appl. No.: 13/505,641

(22) PCT Filed: Jul. 15, 2011

(86) PCT No.: PCT/JP2011/004052
§ 371 (c)(1),
(2), (4) Date: May 2, 2012

(87) PCT Pub. No.: WO2012/017608
PCT Pub. Date: Feb. 9, 2012

(65) Prior Publication Data
US 2012/0220401 A1 Aug. 30, 2012

(30) Foreign Application Priority Data

Aug. 6, 2010 (JP) ................................ 2010-178086

(51) Int. Cl.
*F16H 55/30* (2006.01)
*F01L 1/02* (2006.01)
*F16D 1/108* (2006.01)
*F16D 1/076* (2006.01)
*B21D 53/28* (2006.01)

(52) U.S. Cl.
CPC . *F01L 1/02* (2013.01); *F16H 55/30* (2013.01); *F01L 2103/00* (2013.01); *F16D 1/108* (2013.01); *F16D 1/076* (2013.01); *B21D 53/28* (2013.01); *F01L 1/022* (2013.01)
USPC ......................................... 474/152

(58) Field of Classification Search
USPC ........................................ 474/152; 29/893.33
See application file for complete search history.

(56) References Cited

U.S. PATENT DOCUMENTS

| | | | | |
|---|---|---|---|---|
| 1,852,538 A | * | 4/1932 | Peterson | .......................... 74/443 |
| 2,271,172 A | * | 1/1942 | Heaslet | .......................... 474/165 |
| 3,168,836 A | * | 2/1965 | Militana | ........................ 474/152 |
| 3,439,551 A | * | 4/1969 | Militana | ........................ 474/162 |
| 4,457,269 A | * | 7/1984 | Beardmore | ................. 123/90.31 |

(Continued)

FOREIGN PATENT DOCUMENTS

| | | |
|---|---|---|
| DE | 102 25 977 A1 | 12/2002 |
| DE | 10 2008 017 046 A1 | 10/2009 |

(Continued)

*Primary Examiner* — William A Rivera
*Assistant Examiner* — Michael Riegelman
(74) *Attorney, Agent, or Firm* — Sughrue Mion, PLLC

(57) ABSTRACT

A cam sprocket according to the present invention includes a ring-shaped plate portion having external teeth along its outer circumference; a circular plate portion that is disposed at the radially inner region substantially parallel to the ring-shaped plate portion and at a level difference in axial direction to the ring-shaped plate portion, the circular plate portion being abuttable against one end face in axial direction of the cam shaft; and a tapered portion linking the circular plate portion to the ring-shaped portion at a radially intermediate region. The tapered portion is provided with a plurality of punched portions whose radially inner faces are provided with a partial circular arc shape so as to come into area contact with an outer circumferential surface at the one end face in axial direction of the cam shaft.

4 Claims, 12 Drawing Sheets

(56) References Cited

U.S. PATENT DOCUMENTS

| | | | | |
|---|---|---|---|---|
| 4,848,183 | A | * | 7/1989 | Ferguson ............... 74/574.4 |
| 5,259,269 | A | * | 11/1993 | Swenson, Sr. ........... 74/571.11 |
| 5,655,416 | A | * | 8/1997 | Mott et al. ............. 74/574.2 |
| 6,277,045 | B1 | * | 8/2001 | Waters Scheuer et al. ... 474/152 |
| 6,449,845 | B1 | * | 9/2002 | Specht et al. ........... 29/892.2 |
| 6,722,221 | B2 | * | 4/2004 | Maxwell ................ 74/395 |
| 6,729,172 | B2 | * | 5/2004 | Aizaki ................. 72/329 |
| 7,634,857 | B2 | * | 12/2009 | Ueki et al. ............. 29/893.34 |
| 7,832,247 | B2 | * | 11/2010 | Cho et al. .............. 72/356 |
| 2002/0193194 | A1 | | 12/2002 | Okabe |
| 2008/0047514 | A1 | | 2/2008 | Allen |

FOREIGN PATENT DOCUMENTS

| | | |
|---|---|---|
| JP | 64-057453 U | 4/1989 |
| JP | 02-201005 A | 8/1990 |
| JP | 09-041909 A | 2/1997 |
| JP | 10-121914 A | 5/1998 |
| JP | 2001-062539 A | 3/2001 |

* cited by examiner

Fig. 9
(A)
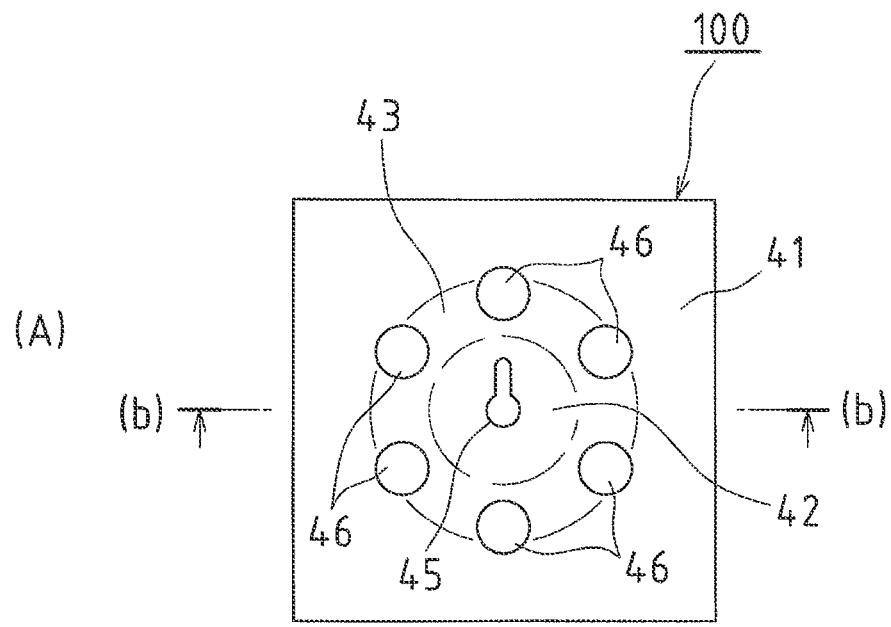
(B)
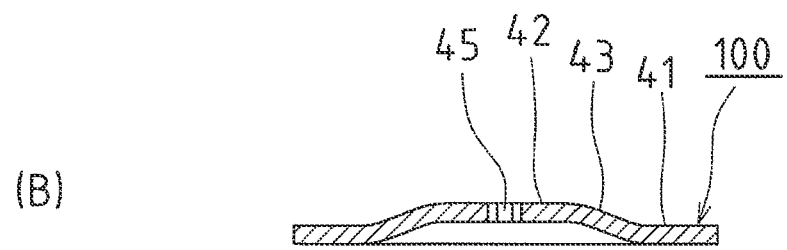

CAM SPROCKET AND METHOD FOR MANUFACTURING THE SAME

CROSS REFERENCE TO RELATED APPLICATION

This application is a National Stage of International Application No. PCT/JP2011/004052, filed on Jul. 15, 2012, which claims priority from JP 2010-178086, filed on Aug. 6, 2010, the contents of all of which are incorporated herein by reference in their entirety.

TECHNICAL FIELD

The present invention relates to a cam sprocket and a method for manufacturing the same.

BACKGROUND ART

A cam sprocket is attached to one end in axial direction of an engine cam shaft, and it is necessary to attach the cam sprocket to the cam shaft while positioning it such that the center of curvature of a virtual circle circumscribing its external teeth matches the rotation axis of the cam shaft.

In order to perform this positioning, it is known to provide a cylindrical portion jutting out to one side in axial direction from the radially inner side of the cam sprocket, and to fit one end in axial direction of the engine cam shaft into this cylindrical portion.

The bottom wall portion of this cylindrical portion is provided with a through hole for a bolt, and by inserting a bolt through this through hole and screwing it to a female screw hole on one end face in axial direction of the cam shaft, the cam sprocket is fixed to the cam shaft.

A conventional cam sprocket provided with such a cylindrical portion is ordinarily fabricated by a sintering process. That is to say, it is fabricated by filling a powdered alloy into a casting die and sintering it. Even though the degree of freedom for shapes in this sintering process is high, and it is possible to make the depth of the cylindrical portion of the cam sprocket as deep as practicable, it has been pointed out that this process is time-consuming so that the manufacturing costs are high.

On the other hand, with the goal of lowering the manufacturing costs, cam sprockets have come to be formed in recent years by stamping. Sprockets made of such stamped components are disclosed for example in PTLs 1 and 2.

PTL 1 discloses a sprocket with a configuration in which two sprocket halves fabricated by stamping are joined together to face the surface. To fabricate the sprocket halves, first, an iron sheet is blanked to form teeth along its circumference and an axial hole by stamping, and punching to one side is performed to provide a boss portion around the axial hole.

PTL 2 discloses a single cam sprocket fabricated by stamping. This cam sprocket is made by a step of stamp a center portion of a disk-shaped steel sheet to form a groove on the bottom, a step of increasing the wall thickness of the outer circumference in axial direction by rotating roll shaping an outer circumference of the disk-shaped steel sheet, a step of forming a marker hole and weight-reducing holes in the disk-shaped steel sheet by punching, a step of lathing the inner diameter of the marker hole, a step of reaming the marker hole, a step of cutting teeth into the outer circumference of the disk-shaped steel sheet, followed by subjecting the disk-shaped steel sheet to carburizing and quenching, shot blasting, and finishing the inner diameter of the marker hole, for example.

CITATION LIST

Patent Literature

PTL 1: JP 64-57453U
PTL 2: JP 2001-62539A

SUMMARY OF INVENTION

Technical Problem

The sprocket disclosed in PTL 1 has a configuration in which two sprocket halves are assembled together, and is not made of a single sheet. Moreover, this sprocket is attached to a middle portion in axial direction of a shaft, and not to one end in axial direction of a cam shaft.

By contrast, the cam sprocket according to PTL 2 is made of a single sheet and is used by being attached to a flange at one end in axial direction of a cam shaft, as stated in Paragraph 0002 and FIG. 6. However, this cam sprocket is provided with bolt holes at a plurality of locations in circumferential direction in a radially intermediate region between the marker hole and the external teeth, and the cam sprocket is fixed to the cam shaft by screwing bolts through these bolt holes to the flange of the cam shaft.

Now, PTL 2 states that in the process of fabricating this cam sprocket a protruding portion is formed that juts out to one side by stamping on the radially inner side. This protruding portion is used as a reference when carrying out the roll shaping of the outer circumference, and is completely eliminated in the step of forming the marker hole.

In the case of this cam sprocket, one end in axial direction of the cam shaft is passed through the marker hole obtained by completely eliminating the protruding portion, and the cam sprocket is attached with bolts to the flange of the cam shaft as described above. In this attachment, one end in axial direction of the cam shaft is fitted into a cylindrical portion of the cam sprocket made of the above-noted sintered component.

However, if the shape of the radially inner side is provided with a cylindrical portion to be fitted to one end in axial direction of the cam shaft is fabricated by stamping, as in the above-described sprocket made of a sintered component, then problems may occur during the formation of the cylindrical portion, such as stripe-shaped cuts or cracks, making the cam sprocket difficult to fabricate. Accordingly, there is still room for improvements.

In view of this situation, it is an object of the present invention to provide a cam sprocket to be attached to one end in axial direction of a cam shaft of an engine, with a shape with which the center of curvature of a virtual circle circumscribing the external teeth of the cam sprocket can be easily positioned at the rotation axis cam shaft, while having a shape that can be manufactured by stamping, so that a rise in the manufacturing costs can be better suppressed than with a sintered component.

Solution to Problem

A cam sprocket according to the present invention is a cam sprocket made of a stamped component that is attachable to one end in axial direction of a cam shaft of an engine, and includes a ring-shaped plate portion that extends in a radial direction at a radially outer region of the cam sprocket by letting a radially inner region of the cam sprocket jut out in one axial direction, and that is provided with external teeth along its outer circumference; a circular plate portion that is disposed at the radially inner region substantially parallel to the ring-shaped plate portion and at a level difference in axial direction to the ring-shaped plate portion, the circular plate portion being abuttable against one end face in axial direction of the cam shaft; and a tapered portion linking the circular plate portion to the ring-shaped portion at a radially intermediate region; wherein the tapered portion is provided with a plurality of punched portions for abutting the circular plate portion against the one face in axial direction of the cam shaft after matching a center of curvature of a circle circumscribing the external teeth to a rotation axis of the cam shaft when attaching the cam sprocket to the one end in axial direction of the cam shaft; and wherein the plurality of punched portions are formed by punching the tapered portion at several locations along the circumferential direction in a direction that is opposite to the direction in which the circular plate portion juts out, and radially inner faces of the punched portions are provided with a partial circular arc shape so as to come into area contact with an outer circumferential surface at the one end in axial direction of the cam shaft.

With this configuration, a cam sprocket fabricated by stamping is provided, in which a plurality of punched portions are provided at several locations in circumferential direction of a tapered portion of the cam sprocket, and a portion is ensured that performs the same operation as the cylindrical portion of the cam sprocket made of a sintered component, which was explained as a conventional example, by providing the radially inner faces of each of the plurality of punched portions with a partially circular arc shape. That is to say, the cam sprocket according to the present embodiment can be provided with a shape with which it can be attached while positioning it at one end in axial direction of the cam shaft, while having a shape with which a rise in the manufacturing costs can be better suppressed than with a sintered component.

In the above-described configuration, it is preferable that the punched portions are provided with a rectangular shape, when viewed from above. With this configuration, since the plurality of punching protrusions on the stamping die for forming the plurality of punched portions can be provided with a relatively simple shape, there is the advantage that the durability of the stamping die can be improved, for example it becomes possible to maintain the shape of the stamping die over long periods of time.

Moreover, a method for manufacturing a cam sprocket made of a stamped component is provided, which includes the following steps of press-protruding, in which a ring-shaped plate portion is provided at a radially outer region by causing a center region of a metal sheet to jut out in one axial direction, a circular plate portion is provided that is disposed at a central region substantially parallel to the ring-shaped plate portion and at a level difference in axial direction to the ring-shaped plate portion, and a tapered portion is provided between the circular plate portion and the ring-shaped plate portion press; blanking, in which a contour of the ring-shaped plate portion of the metal sheet is made circular and external teeth are provided at an outer circumference; and press-punching, in which punched portions are provided by punching the tapered portion at several locations along its circumferential direction in a direction that is opposite to the direction in which the circular plate portion juts out.

With this configuration, in the steps for obtaining a cam sprocket made of a stamped component, it is possible to fabricate the cam sprocket using a stamping die of a relatively simple shape, which has the advantage that the work efficiency can be improved.

Advantageous Effects of Invention

With the cam sprocket according to the present invention a cam sprocket to be attached to one end in axial direction of a cam shaft of an engine can be provided with a shape that can be manufactured by stamping, so that the an increase in manufacturing costs can be better suppressed than with sintering, and moreover a shape with which the center of curvature of a virtual circle circumscribing the external teeth of the cam sprocket can be easily positioned at the rotation axis of the cam shaft. Moreover, with the method for manufacturing a cam sprocket according to the present invention, it is possible to manufacture this cam sprocket easily and with high efficiency.

BRIEF DESCRIPTION OF DRAWINGS

FIGS. 9(A) and 9(B) show diagrams illustrating a processing object obtained by a second pressing step, which follows that in FIGS. 8(A) and 8(B), with FIG. 9(A) being a front view and FIG. 9(B) being a cross-sectional view taken in arrow direction along the line (b)-(b) in FIG. 9(A).

DESCRIPTION OF EMBODIMENTS

Referring to the appended drawings, the following is a detailed explanation of a best mode for carrying out the invention.

Figure 5:
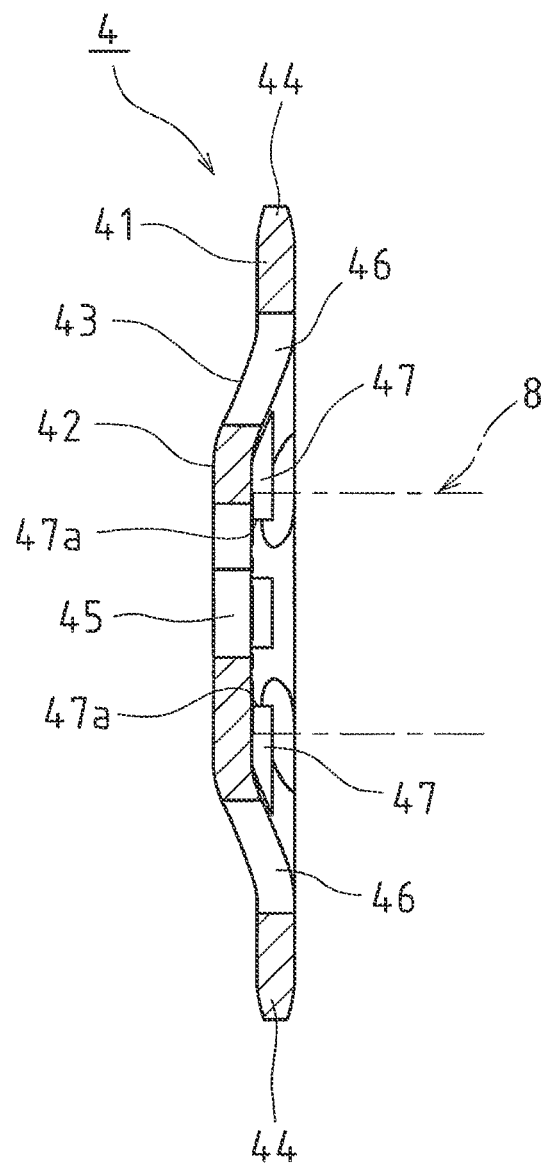
FIG. 5 is a cross-sectional view taken in arrow direction along the line (5)-(5) in FIG. 4.
Figure 6:
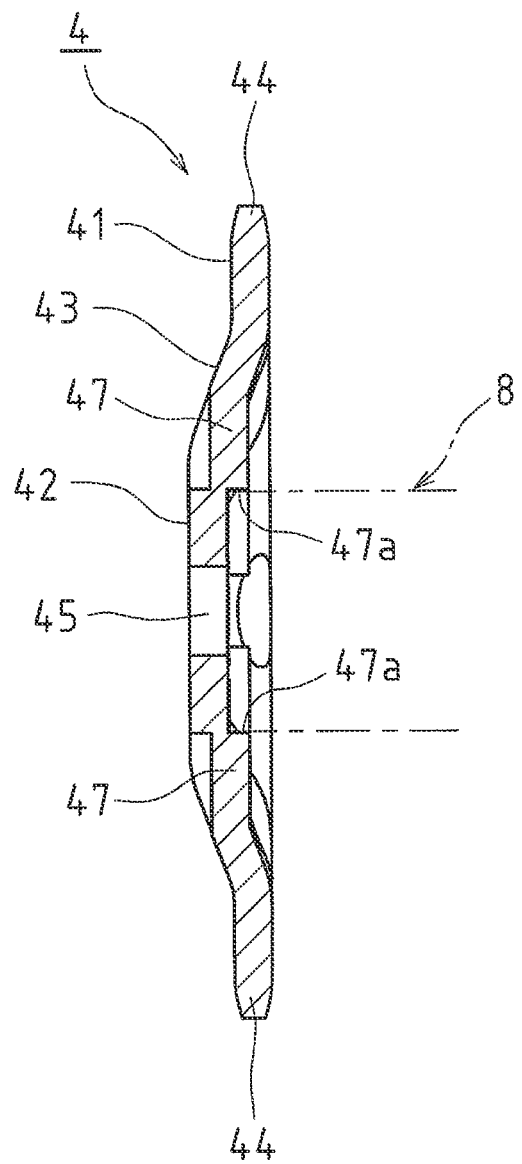
FIG. 6 is a cross-sectional view taken in arrow direction along the line (6)-(6) in FIG. 4.
Figure 7:
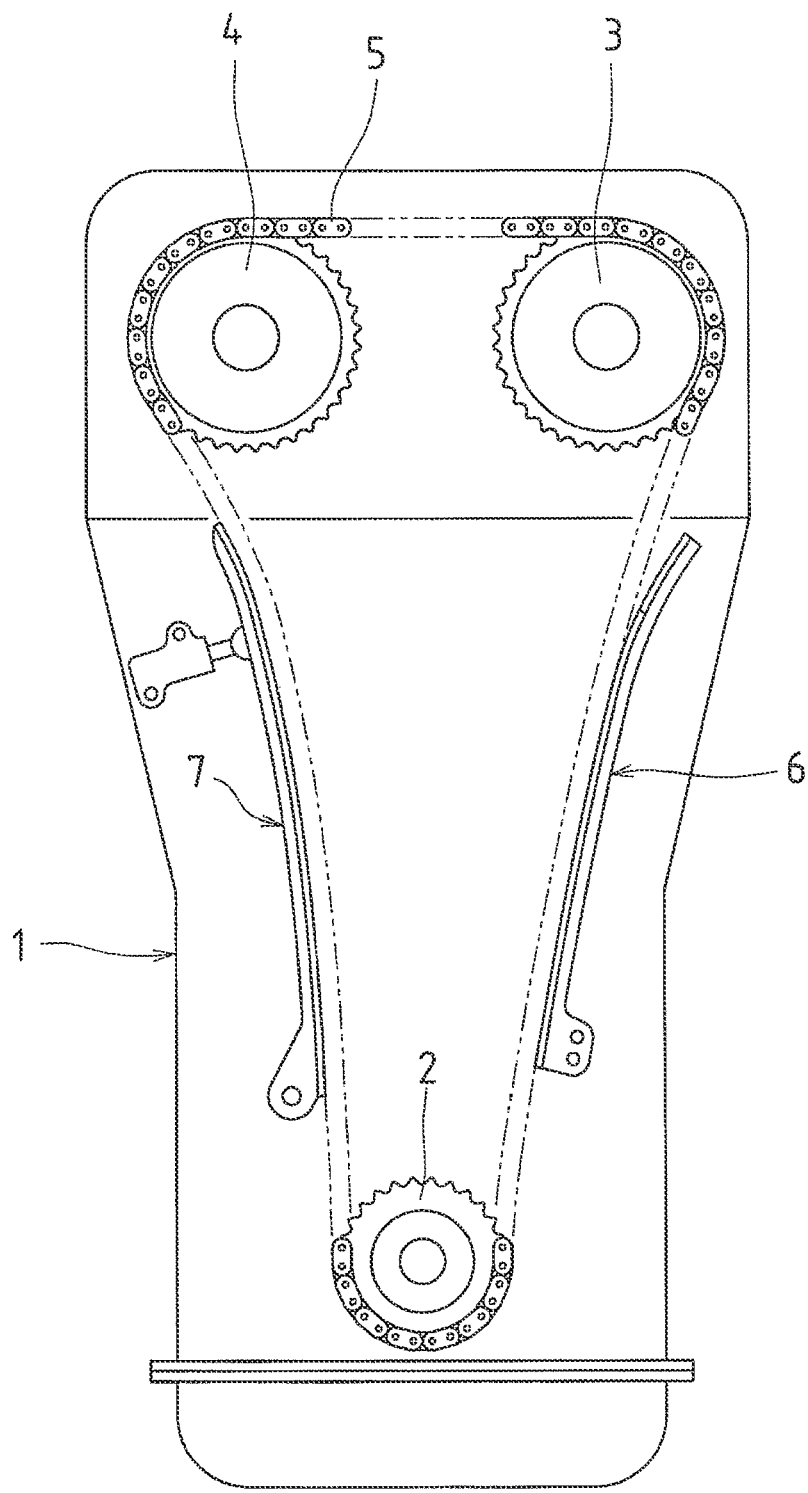
FIG. 7 is a reference view showing how the cam sprocket according to one embodiment of the present invention is used in an engine.

FIGS. 1 to 12 show one embodiment of the present invention. First, as shown in FIG. 7, a crank sprocket 2, an intake-side cam sprocket 3, and a exhaust-side cam sprocket 4 are installed on the front side of an engine 1. A chain 5 is wound around the crank sprocket 2 and the two cam sprockets 3 and 4. It should be noted that numeral 6 denotes a chain damper and numeral 7 denotes a chain tensioner.

In this embodiment, an example is described in which the present invention is applied for example to the exhaust-side cam sprocket 4, out of the two cam sprockets 3 and 4.

Figure 1:
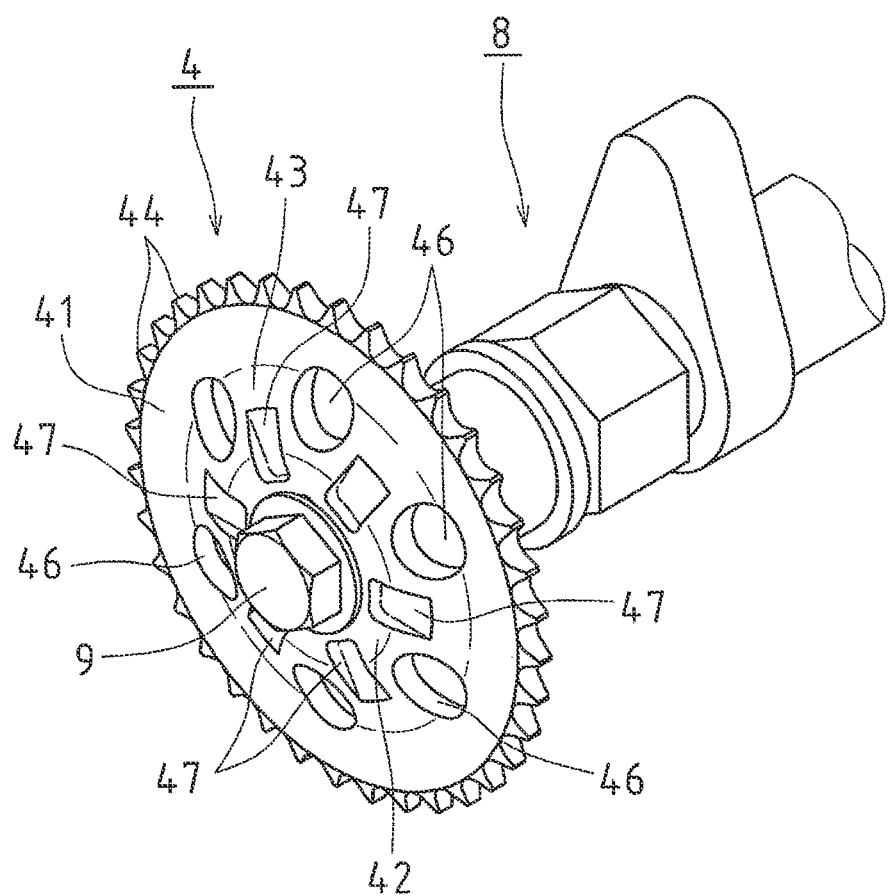
FIG. 1 is a perspective view showing a cam sprocket according to one embodiment of the present invention in a state in which it is attached to a cam shaft.
Figure 2:
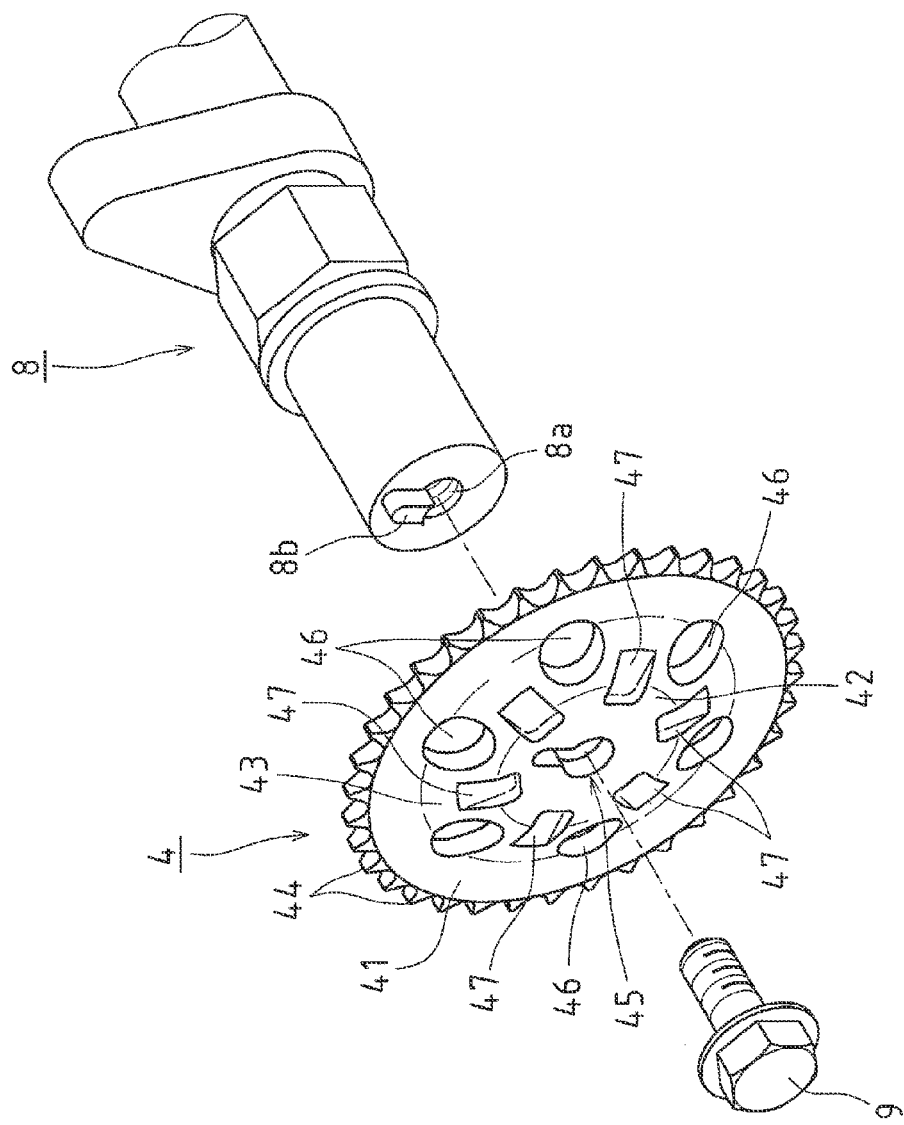
FIG. 2 is a perspective view showing a state in which the cam sprocket in FIG. 1 is removed from the cam shaft.
Figure 3:
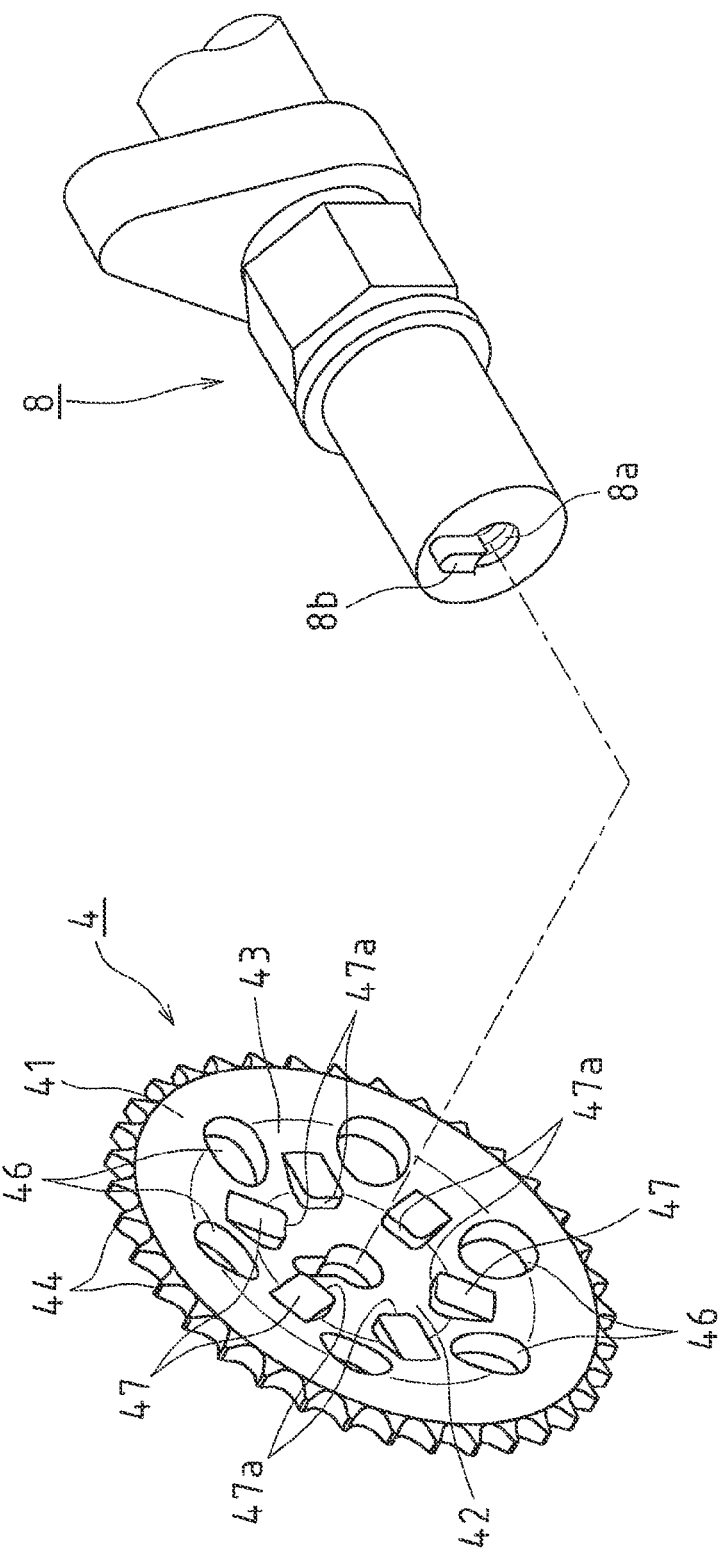
FIG. 3 is a perspective view of the cam sprocket in FIG. 2 taken from the rear side.

As shown in FIGS. 1 to 3, this cam sprocket 4 is attached with a bolt 9 to one end face in axial direction of an exhaust-side cam shaft 8, and is made of a stamped component that is fabricated with a saucer-like shape with a radially inward region jutting out in one axial direction.

One end face in axial direction of the cam shaft 8 is provided with a female threaded hole 8a into which the bolt 9 is screwed, and near this female threaded hole 8a, a key-shaped protrusion 8b is provided, which serves as a marker for the attaching position of the cam sprocket 4.

On the other hand, the cam sprocket 4 is provided with a ring-shaped plate portion 41 on its radially outer side, a circular flat plate portion 42 on its radially inner side, and a tapered portion 43 between them in radial direction.

The ring-shaped plate portion 41 has a shape extending in radial direction, and is provided on its outer circumference with a plurality of external teeth 44 protruding radially outward. The circular flat plate portion 42 is formed substantially parallel to the ring-shaped plate portion 41, with a level difference in axial direction, and is provided at its center with a key hole 45 for inserting a bolt and positioning in circumferential direction. The tapered portion 43 is provided so as to link the circular flat plate portion 42 to the ring-shaped plate portion 41, and is provided with circular holes 46 for weight reduction that axially penetrates the tapered portion 43 at several locations in circumferential direction.

Furthermore, punched portions 47 are provided at several locations in circumferential direction in a region reaching from the tapered portion 43 to the circular flat plate portion 42. This plurality of punched portions 47 is provided in order to position the circular flat plate portion 42 in a state in which it abuts against one end in axial direction of the cam shaft 8, after matching the center of curvature 83 (see FIG. 4) of a virtual circle 82 circumscribing the external teeth 44 with the rotation axis of the cam shaft 8 when attaching the cam sprocket 4 to one end in axial direction of the cam shaft 8.

Figure 4:
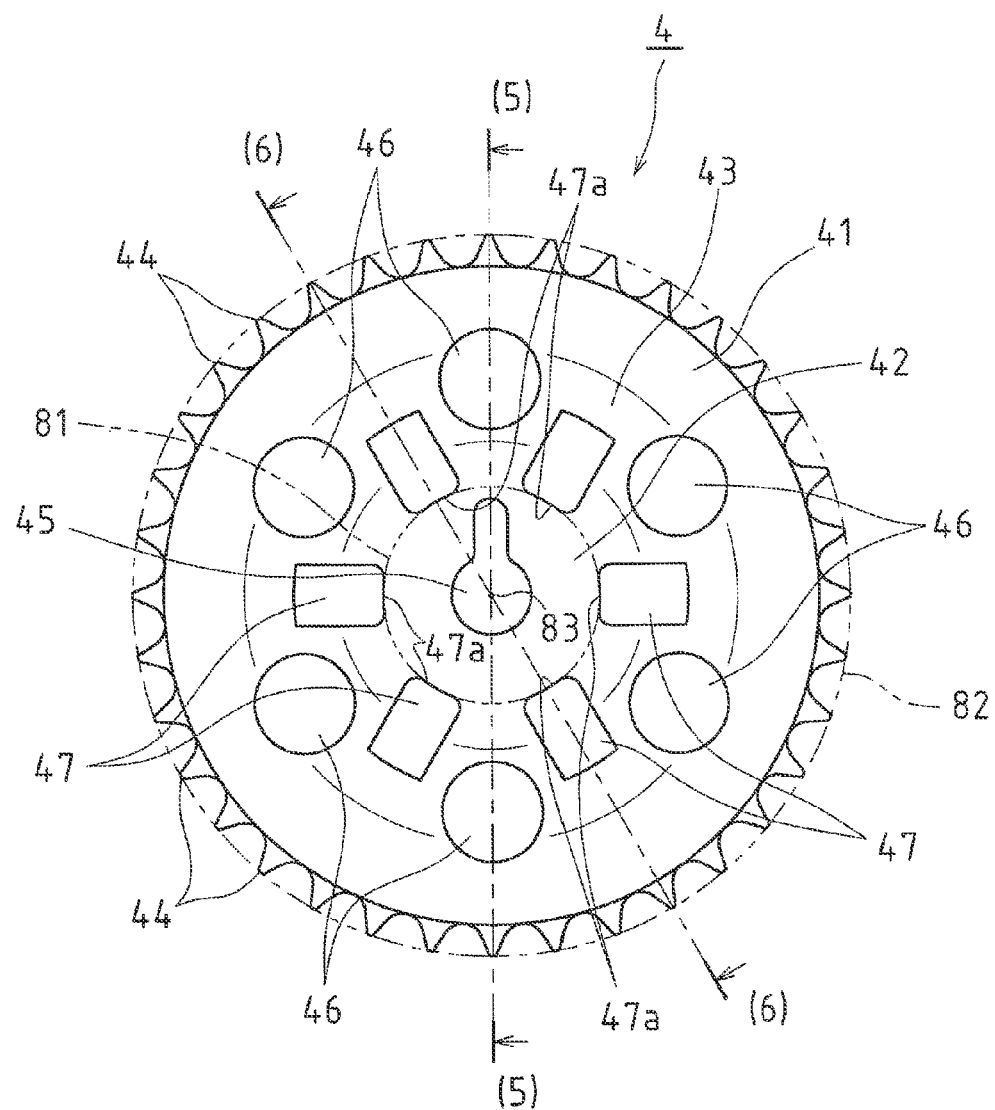
FIG. 4 is a front view of the cam sprocket in FIG. 1.

More specifically, as shown in FIGS. 5 and 6, the punched portions 47 are formed at several locations in circumferential direction of the tapered portion 43 by being punched in a direction opposite to the direction in which the circular flat plate portion 42 juts out. As shown in FIG. 4, each of the radially inner faces 47a of the individual punched portions 47 is provided with a partial circular arc shape so as to achieve area contact with the outer circumferential surface on the one end in axial direction of the cam shaft 8.

That is to say, even though the plurality of punched portions 47 are not continuous in circumferential direction, one end in axial direction of the cam shaft 8 is fitted into the space on the radially inner side enclosed respectively by these radially inner faces 47a.

Now, the dimension of the diameter of the virtual circle 81 (see FIG. 4) that is obtained by inscribing a circle into the radially inner faces 47a of the plurality of punched portions 47 is set to a dimension that substantially matches or is slightly larger than the dimension of the outer diameter on one end in axial direction of the cam shaft 8. Thus, the one end in axial direction of the cam shaft 8 can be fitted precisely or loosely into the space on the radially inner side enclosed by the individual radially inner faces 47a of the plurality of punched portions 47. Being fitted in this way, the center of curvature 83 (see FIG. 4) of the virtual circle 82 circumscribing the external teeth 44 of the cam sprocket 4 comes to be positioned so that it matches the rotation axis of the cam shaft 8.

Thus, the cam sprocket 4, which is made of a stamped component, is formed in a shape having a portion that is fitted by a so-called "faucet" fit to one end in axial direction of the cam shaft 8.

Referring to FIGS. 8 to 12, the following is an explanation of a method for manufacturing a cam sprocket 4, which is a stamped component.

Figure 8:
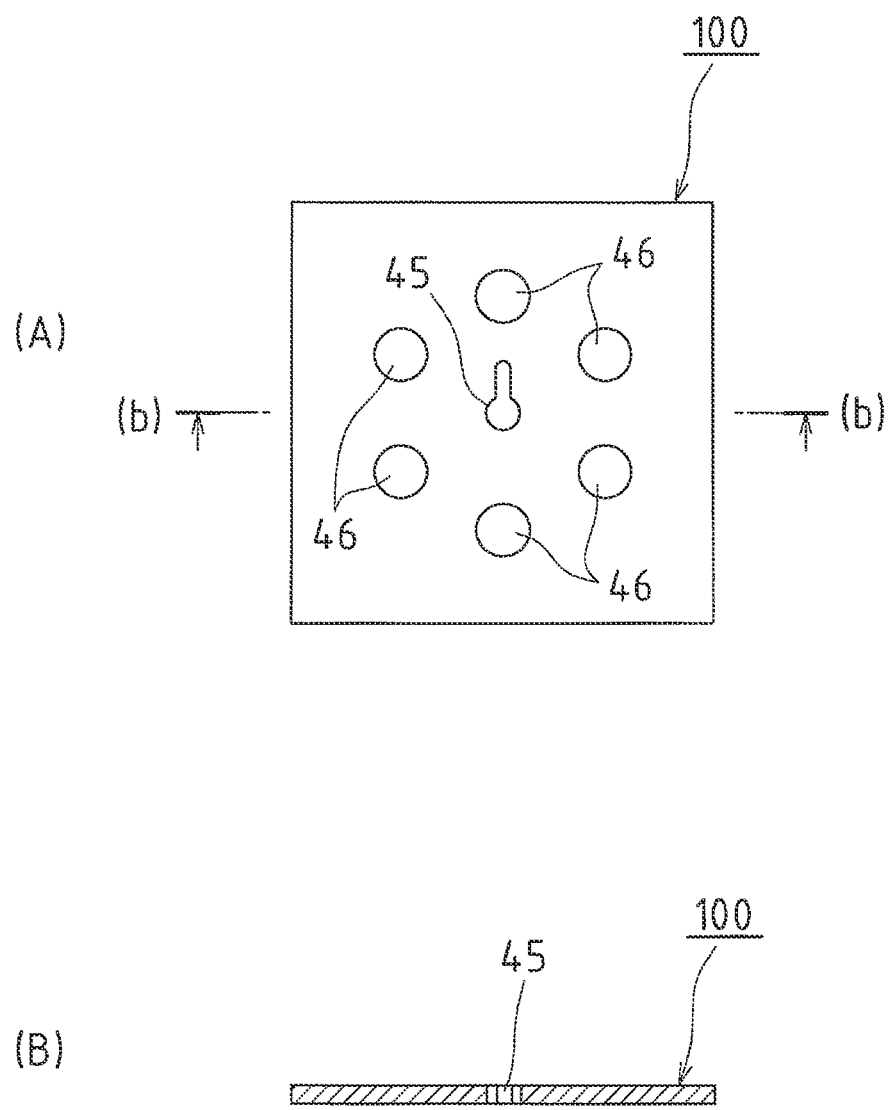
FIGS. 8(A) and 8(B) show diagrams illustrating a processing object obtained by a first pressing step in a procedure for manufacturing the cam sprocket in FIGS. 1 to 5, with FIG. 8(A) being a front view and FIG. 8(B) being a cross-sectional view taken in arrow direction along the line (b)-(b) in FIG. 8(A).

First of all, as shown in FIG. 8, in a first pressing step, a key hole 45 is formed at the center of a metal sheet 100, which may have a square shape for example, and circular holes 46 for reducing weight are formed at a plurality of locations surrounding the key hole 45 on a circular path. In this first pressing step, the holes are opened by pressing the metal sheet 100 using a punch and a die block, which are not shown in the drawing. As a material for the metal sheet 100, SPH 440 (hot-rolled steel) or the like may be used, for example.

As shown in FIG. 9, in a second pressing step, the ring-shaped plate portion 41 is provided in a radially outer region, the circular flat plate portion 42 is provided at a central region, and the tapered portion 43 is provided between the circular flat plate portion 42 and the ring-shaped plate portion 41, by causing the central region of the metal sheet 100 to just out toward the front side or the rear side of the metal sheet 100. In this second pressing step, a level step is fabricated by pressing the metal sheet 100 using a punch and a die block, which are not shown in the drawings.

Figure 10:
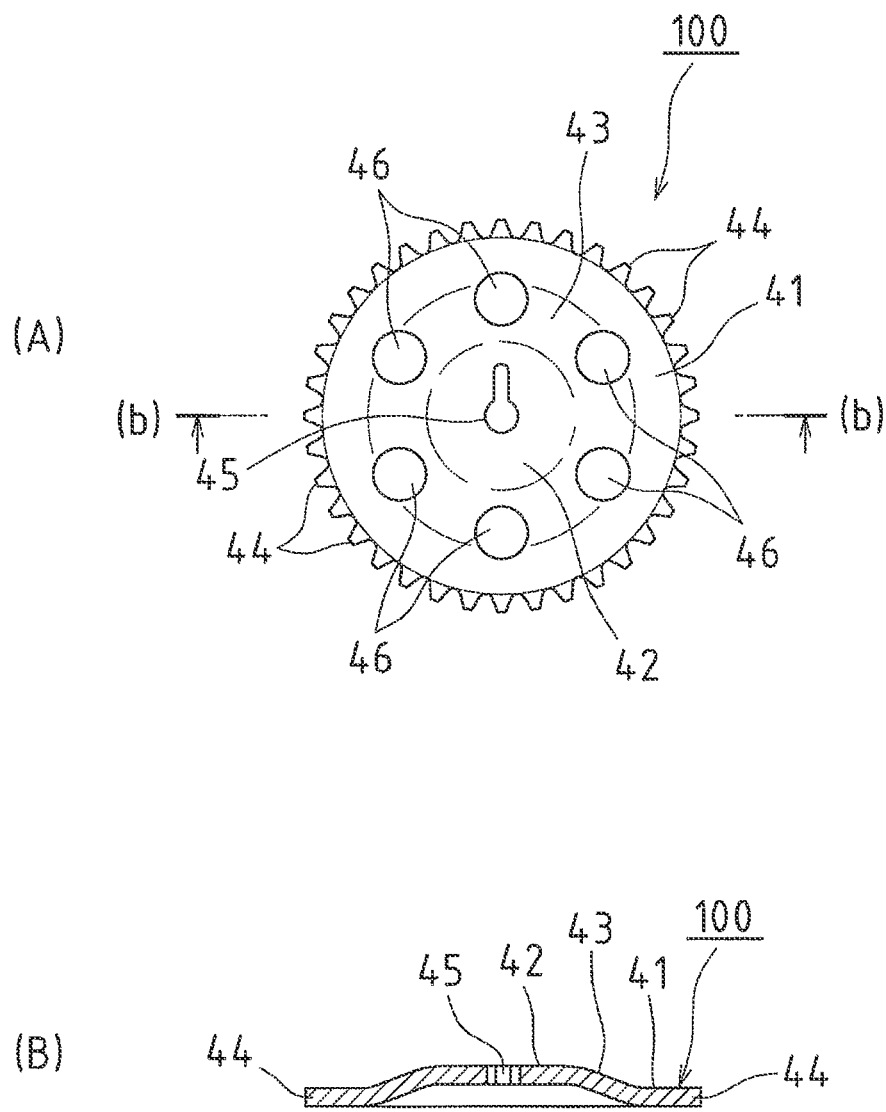
FIGS. 10(A) and 10(B) show diagrams illustrating a processing object obtained by a third pressing step, which follows that in FIGS. 9(A) and 9(B), with FIG. 10(A) being a front view and FIG. 10(B) being a cross-sectional view taken in arrow direction along the line (b)-(b) in FIG. 10(A).

As shown in FIG. 10, in a third pressing step, the contour of the ring-shaped plate portion 41 of the metal sheet 100 is made circular and external teeth 44 are provided on the outer circumference. In this third pressing step, superfluous portions in the radially outer region are removed by press trimming the metal sheet 100 using a punch and a die block, which are not shown in the drawings, thus forming the external teeth 44.

Figure 11:
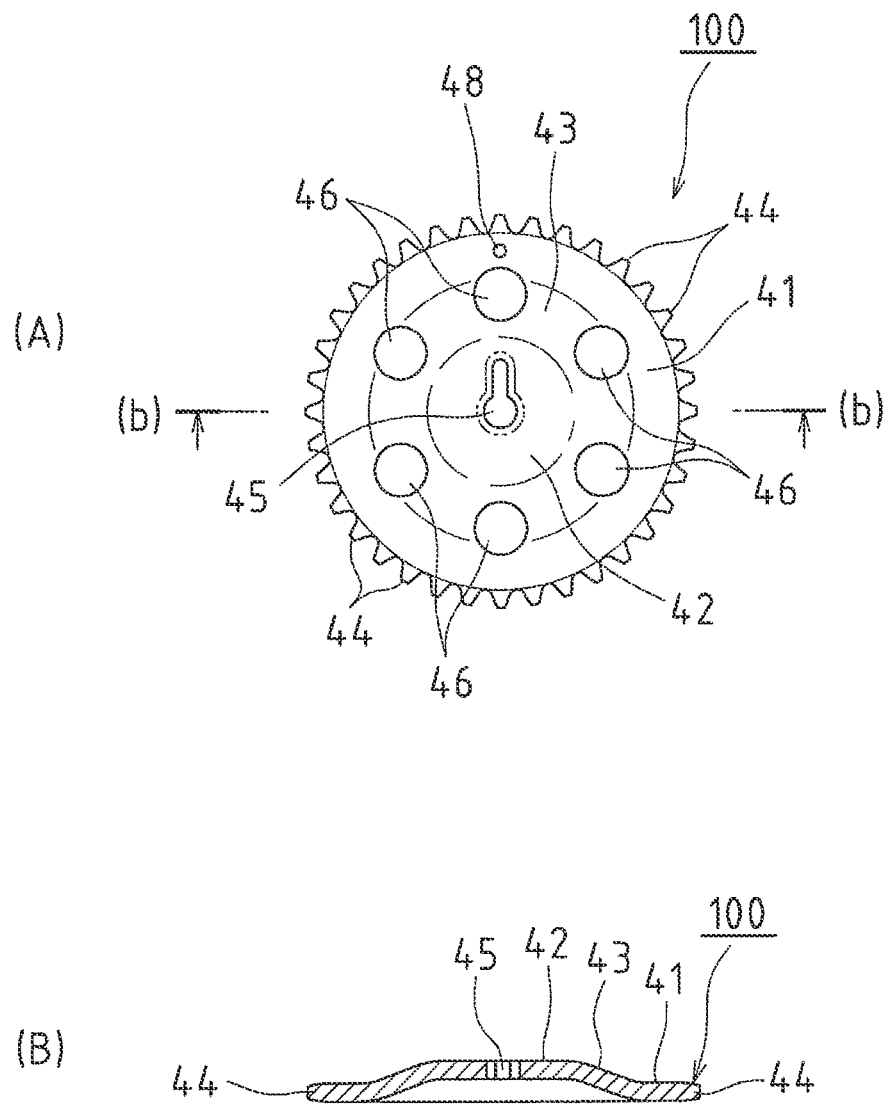
FIGS. 11(A) and 11(B) show diagrams illustrating a processing object obtained by a fourth pressing step, which follows that in FIGS. 10(A) and 10(B), with FIG. 11(A) being a front view and FIG. 11(B) being a cross-sectional view taken in arrow direction along the line (b)-(b) in FIG. 11(A).

As shown in FIG. 11, in a fourth pressing step, the shape of the external teeth 44 is trimmed, the edge of the key hole 45 is lifted, as shown by the virtual line, and furthermore, a depression serving as an alignment mark 48 is fabricated. In this fourth pressing step, the external teeth 44 and the key hole 45 of the metal sheet 100 are coined by pressing the metal sheet 100 using a punch and a die block, which are not shown in the drawings.

Figure 12:
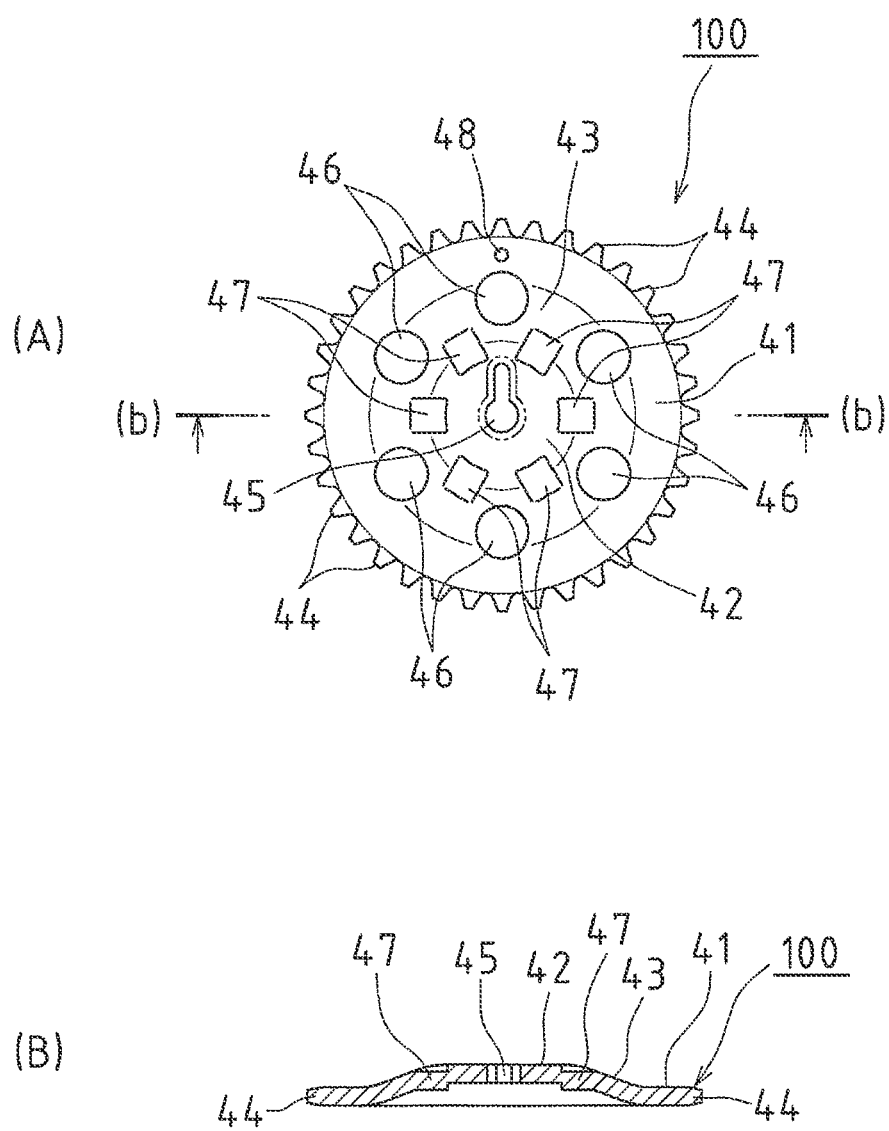
FIGS. 12(A) and 12(B) show diagrams illustrating a processing object obtained by a fifth pressing step, which follows that in FIGS. 11(A) and 11(B), with FIG. 12(A) being a front view and FIG. 12(B) being a cross-sectional view taken in arrow direction along the line (b)-(b) in FIG. 12(A).

As shown in FIG. 12, in a fifth pressing step, punched portions 47 are provided by punching, in a direction opposite to the direction in which the circular flat plate portion 42 just out, several locations in circumferential direction of a region extending from the tapered portion 43 to the circular flat plate portion 42 of the metal sheet 100. In this fifth pressing step, by pressing the metal plate 100 using a punch and a die block, which are not shown in the drawings, the punched portions 47 are transfer-formed by plastic deformation of predetermined locations in the metal sheet 100 with a protrusion for transferring the punched portions 47, which is provided at the punch.

After this, the process is finished by subjecting the metal sheet 100 to shot blasting as appropriate.

As explained above, in an embodiment to which the present invention is applied, a cam sprocket 4 fabricated by stamping is provided, in which a plurality of punched portions 47 are provided at several locations in circumferential direction of a tapered portion 43 of the cam sprocket, and a portion is ensured that performs the same operation as the cylindrical portion of the cam sprocket made of a sintered component, which was explained as a conventional example, by providing the radially inner faces 47a of the plurality of punched portions 47 respectively with a partially circular arc shape. That is to say, the cam sprocket 4 according to this embodiment can be provided with a shape with which it can be attached while positioning it at one end in axial direction of the cam shaft 8, while having a shape with which a rise in the manufacturing costs can be better suppressed than with a sintered component. Consequently, with the present invention, it is possible to provide a cam sprocket 4 that has a sufficient positioning precision, while being of relatively low cost.

In particular, in this embodiment, since the plurality of punched portions 47 are made rectangular when viewed from above, the plurality of punching protrusions on the stamping die, which is not shown in the drawings, can be provided with a relatively simple shape. Therefore, there is the advantage in that the durability of the stamping die can be improved, for example it becomes possible to maintain the shape of the stamping die over long periods of time. Moreover, in the first pressing step to fifth pressing step for fabricating the cam sprocket 4 according to the present embodiment, as can be seen from the shapes obtained by the respective steps, although they are not shown in the drawings, stamping dies of relatively simple shape can be used, so that there is the advantage that the work efficiency can be improved.

The present invention may be embodied in various other forms without departing from the spirit or essential characteristics thereof. Therefore, the above-described embodiments are considered in all respects as illustrative and not limiting. The scope of the invention is indicated by the appended claims rather than by the foregoing description. All variations and modifications falling within the equivalency range of the appended claims are intended to be embraced therein.

For example, in the above-described embodiment, an example was given in which the cam sprocket 4 is attached to one end in axial direction of the cam shaft 8, but the present invention is not limited to this. Although not shown in the drawings, an embodiment is possible, in which, for example if a controller with variable valve timing (VVT) is provided at one end in axial direction of the cam shaft 8, a cylindrical housing of the controller is fitted to the radially inner space enclosed by the radially inner faces 47a of the plurality of punched portions 47 in the cam sprocket 4.

The present invention claims the benefit of priority of Japanese Patent Application No. 2010-178086, filed in Japan on Aug. 8, 2010, the entire content of which is incorporated by reference in this application.

INDUSTRIAL APPLICABILITY

The cam sprocket according to the present invention has a shape that does not need to be manufactured by a costly sintering process and is easy to manufacture by an inexpensive pressing or punching process, and is thus very beneficial for the manufacture of engines.

REFERENCE SIGNS LIST 4 cam sprocket
8 cam shaft
9 bolt
41 ring-shaped plate portion of cam sprocket
42 circular flat plate portion of cam sprocket
43 tapered portion of cam sprocket
44 key hole
47 punched portions
47a radially inner faces of punched portions
81 virtual circle inscribed in radially inner faces of punched portions
82 virtual circle circumscribed around external teeth
83 center of curvature of circumscribed virtual circle

The invention claimed is:

1. A cam sprocket made of a stamped component that is attachable to one end in axial direction of a cam shaft of an engine, comprising:
a ring-shaped plate portion that extends in a radial direction at a radially outer region of the cam sprocket by letting a radially inner region of the cam sprocket jut out in one axial direction, and that is provided with external teeth along its outer circumference;
a circular plate portion that is disposed at the radially inner region substantially parallel to the ring-shaped plate portion and at a level difference in axial direction to the ring-shaped plate portion, the circular plate portion being abuttable against one end face in axial direction of the cam shaft; and
a tapered portion linking the circular plate portion to the ring-shaped portion at a radially intermediate region;
wherein the tapered portion and the circular plate portion is provided with a plurality of punched portions for abutting the circular plate portion against the one face in axial direction of the cam shaft after matching a center of curvature of a circle circumscribing the external teeth to a rotation axis of the cam shaft when attaching the cam sprocket to the one end in axial direction of the cam shaft; and
wherein the plurality of punched portions are formed by punching at several locations along the circumferential direction in a direction that is opposite to the direction in which the circular plate portion juts out, and radially inner faces of the punched portions are provided with a partial circular arc shape so as to come into area contact with an outer circumferential surface at the one end in axial direction of the cam shaft.

2. The cam sprocket according to claim 1,
wherein each of the punched portions is provided with a rectangular shape, when viewed in a front view.

3. A method for manufacturing a cam sprocket made of a stamped component according to claim 1, the method comprising the following steps of:
press-protruding, in which a ring-shaped plate portion is provided at a radially outer region by causing a center region of a metal sheet to jut out in one axial direction, a circular plate portion is provided that is disposed at a central region substantially parallel to the ring-shaped plate portion and at a level difference in axial direction to the ring-shaped plate portion, and a tapered portion is provided between the circular plate portion and the ring-shaped plate portion;
press-blanking, in which a contour of the ring-shaped plate portion of the metal sheet is made circular and external teeth are provided at an outer circumference; and
press-punching, in which punched portions are provided by punching at several locations along its circumferential direction in a direction that is opposite to the direction in which the circular plate portion juts out.

4. A method for manufacturing a cam sprocket made of a stamped component according to claim 2, the method comprising the following steps of:

press-protruding, in which a ring-shaped plate portion is provided at a radially outer region by causing a center region of a metal sheet to jut out in one axial direction, a circular plate portion is provided that is disposed at a central region substantially parallel to the ring-shaped plate portion and at a level difference in axial direction to the ring-shaped plate portion, and a tapered portion is provided between the circular plate portion and the ring-shaped plate portion;

press-blanking, in which a contour of the ring-shaped plate portion of the metal sheet is made circular and external teeth are provided at an outer circumference; and press-punching, in which punched portions are provided by punching at several locations along its circumferential direction in a direction that is opposite to the direction in which the circular plate portion juts out.

* * * * *